(12) United States Patent
Kishimoto et al.

(10) Patent No.: US 7,188,149 B2
(45) Date of Patent: Mar. 6, 2007

(54) STORAGE OPERATING DATA CONTROL SYSTEM

(75) Inventors: Toshimichi Kishimoto, Hadano (JP);
Masaharu Murakami, Odawara (JP);
Yoshio Mitsuoka, Odawara (JP);
Tatsuya Murakami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 725 days.

(21) Appl. No.: 09/842,001

(22) Filed: Apr. 26, 2001

(65) Prior Publication Data

US 2002/0129122 A1    Sep. 12, 2002

(30) Foreign Application Priority Data

Mar. 7, 2001    (JP) .............................. 2001-062788

(51) Int. Cl.
*G06F 15/16*    (2006.01)
*G06F 15/173*    (2006.01)

(52) U.S. Cl. .................. 709/217; 709/240; 709/219

(58) Field of Classification Search ................ 709/219, 709/217, 240; 711/147, 6; 719/318, 321; 713/200; 707/10

See application file for complete search history.

(56) References Cited

U.S. PATENT DOCUMENTS

| | | | | |
|---|---|---|---|---|
| 5,416,914 A * | 5/1995 | Korngiebel et al. | ........ | 711/114 |
| 5,838,891 A * | 11/1998 | Mizuno et al. | ................ | 714/5 |
| 5,867,736 A * | 2/1999 | Jantz | ........................... | 710/74 |
| 5,901,327 A * | 5/1999 | Ofek | .............................. | 710/5 |
| 5,931,918 A * | 8/1999 | Row et al. | .................. | 719/321 |
| 6,044,442 A * | 3/2000 | Jesionowski | ................ | 711/153 |
| 6,092,216 A * | 7/2000 | Kobayashi et al. | ............ | 714/9 |
| 6,185,655 B1 * | 2/2001 | Peping | .......................... | 711/6 |
| 6,195,680 B1 * | 2/2001 | Goldszmidt et al. | ........ | 709/203 |
| 6,275,939 B1 * | 8/2001 | Garrison | ..................... | 713/200 |
| 6,328,766 B1 * | 12/2001 | Long | .............................. | 710/8 |
| 6,338,110 B1 * | 1/2002 | van Cruyningen | .......... | 710/317 |
| 6,353,287 B1 * | 3/2002 | Sasaki et al. | ............... | 313/582 |
| 6,370,605 B1 * | 4/2002 | Chong, Jr. | .................... | 710/33 |
| 6,377,993 B1 * | 4/2002 | Brandt et al. | ............... | 709/227 |
| 6,389,432 B1 * | 5/2002 | Pothapragada et al. | ..... | 707/205 |
| 6,397,267 B1 * | 5/2002 | Chong, Jr. | ..................... | 710/1 |
| 6,434,543 B1 * | 8/2002 | Goldberg et al. | .............. | 707/2 |
| 6,438,595 B1 * | 8/2002 | Blumenau et al. | .......... | 709/226 |
| 6,480,905 B1 * | 11/2002 | Jesionowski et al. | .......... | 710/8 |
| 6,493,811 B1 * | 12/2002 | Blades et al. | ............... | 711/203 |
| 6,502,167 B1 * | 12/2002 | Tanaka et al. | .............. | 711/114 |
| 6,507,581 B1 * | 1/2003 | Sgammato | .................. | 370/381 |

(Continued)

FOREIGN PATENT DOCUMENTS

JP    8263225    10/1996

*Primary Examiner*—Rupal Dharia
*Assistant Examiner*—Kristie D. Shingles
(74) *Attorney, Agent, or Firm*—Antonelli, Terry, Stout and Kraus, LLP.

(57) ABSTRACT

A storage system for covering advantages of the "In band method" and the "Out of band method", including an external storage device having storage data and storage operating data for operating the storage host computer connected to the external storage device on which an application is able to operate, and a storage operating server connected to the external storage device and the host computer, and having a storage operating server program, for obtaining the storage operating data from the external storage device, where the application operates the storage operating data through the storage data server program.

14 Claims, 3 Drawing Sheets

U.S. PATENT DOCUMENTS

| | | | |
|---|---|---|---|
| 6,532,459 B1 * | 3/2003 | Berson | 707/3 |
| 6,604,155 B1 * | 8/2003 | Chong, Jr. | 710/56 |
| 6,643,700 B1 * | 11/2003 | Rosen et al. | 709/227 |
| 6,721,317 B2 * | 4/2004 | Chong, Jr. | 370/389 |
| 6,738,772 B2 * | 5/2004 | Regelski et al. | 707/10 |
| 6,801,960 B1 * | 10/2004 | Ericson et al. | 710/33 |
| 6,842,769 B1 * | 1/2005 | Kim et al. | 709/203 |
| 6,868,543 B1 * | 3/2005 | Nusbickel | 719/318 |
| 6,999,448 B1 * | 2/2006 | Klein | 370/352 |
| 2005/0216421 A1 * | 9/2005 | Barry et al. | 705/64 |

* cited by examiner

STORAGE OPERATING DATA CONTROL SYSTEM

FIELD OF THE INVENTION

The present invention relates to an operating control system of a storage, and in particular relates to a storage operating control system having a storage operating server therein.

BACKGROUND OF THE INVENTION

For storage operating control methods, roughly dividing, there are two main ways. One is an "In band method", in which storage operating data, such as, structure information of the storage, maintenance information, etc., is operated, thereby to conduct the operating control, by using the same interface, through which a host computer performs read-out/write-in of data on the storage. The other one is an "Out of band method", in which the operating control is carried out through an interface, which is perfectly different, physically and theoretically, from the interface, through which the read-out/write-in on the storage is conducted from the host computer.

In the former, there is an advantage that the storage operating control can be linked with an application(s) of the host computer easily, while in the latter, there are advantages, that the operating control does not depend upon the operating system on the host computer, and that it is possible to conduct the storage operating control at any time without preparation of an exclusive storage operating agent on the host computer. Further, in the latter, there is an advantage for the host computer that a system can be assembled with no attention to or awareness of the storage operating control.

FIG. 2 shows one of the conventional methods, which is called by the "In band method". The host computer 101 and an external storage device 108 are connected to each other through a Fiber Channel 103, and through this interface are transferred storage data 105 and storage operating data 107. Also, in the host computer 101 is prepared a storage operating agent 201. The storage operating of the external storage device 108 carries out the control from a storage operating terminal 202 through the storage operating agent 201 on the host computer 101. The storage operating terminal 202 and the host computer 101 are connected through a LAN, in which TCP/IP 104 is used as protocol thereof.

In this method, since an application 102 and the storage operating agent 201 are operating on the same host computer 101, there is an advantage that the storage operating control can be performed in linking or cooperation with each other, depending upon the convenience of the application 201. On the contrary, it is necessary to introduce the storage operating agent 201 into each the host computer 101, therefore the storage operating agents operable upon the various operating systems of the host computers 101 must be prepared and further installed in advance, respectively. Also, the storage operating control is unavailable when the host computer 101 is not initialized or started.

FIG. 3 shows one of the conventional methods, which is called by the "Out of band method". In the external device 108 are stored storage data 105 and storage operating data 107, and it is characterized that each communicates with an outside through the respective interfaces. The storage data 105 is connected with the host computer 101 through the Fiber Channel 103. The storage operating terminal 202 is connected through the LAN to a service processor 106 for managing the storage operating data 107, thereby performing the communication therebetween.

With this method, there is an advantage that the operating control of the storage can be performed without an attention nor consciousness of the host computer. Accordingly, no such the storage operating agent 201 is necessary, as in the "In band method", and the storage operation does not depend upon a platform of the host computer. However, since the storage operating terminal 202 and the host computer 101 use the interfaces, being totally different from each other, they are independent, therefore it is impossible to link or cooperate the application on the host computer 101 with the storage operation.

SUMMARY OF THE INVENTION

With the storage operating control according to the "In band method", there is a necessity of developing software for the storage operating agent depending upon the respective operating systems in the host computers. And further, the software for storage operating agent must be installed into the host computers, in advance. Also, since the storage is managed or operated by the software for the storage operating agent on the host computer, the operation of the storage cannot be performed if the host computer is not initiated or started.

With the "Out of band method", since the storage operating control is conducted by using the interface, being independent from that of the host computer, therefore, according to the conventional technology, it is impossible to link with the application of the host computer. Therefore, there is a necessity of a method, for complementing the drawbacks of both of them, each other.

Further, in the conventional methods, in any one of them, the storage operating control is remote control from the storage operating terminal, therefore uncertainty is still remained in the security on the storage operation for a user of the storage.

As a means for covering the advantages of the "In band method" and the "Out of band method", a method is proposed for expanding the "Out of band method". Namely, with adoption of the "Out of band method", a storage operating server is conducted from the interface for use of the storage operation, and further on the storage operating server is provided a general-purpose interface, for operating the application directly, thereby enabling the host computer to control the operation of the storage. With this, it is possible to take in the advantages of the "In band method" while enjoining those of the "Out of band method" together. Further, with provision of a cut-off switch in the interface for use in the storage operation data, the storage operation by a third party can be refused whenever it is necessary by initiative of the user of the storage.

DESCRIPTION OF THE PREFERRED EMBODIMENTS

Hereinafter, embodiments according to the present invention will be fully explained by referring to the attached FIGS. 1 to 4.

Figure 1:
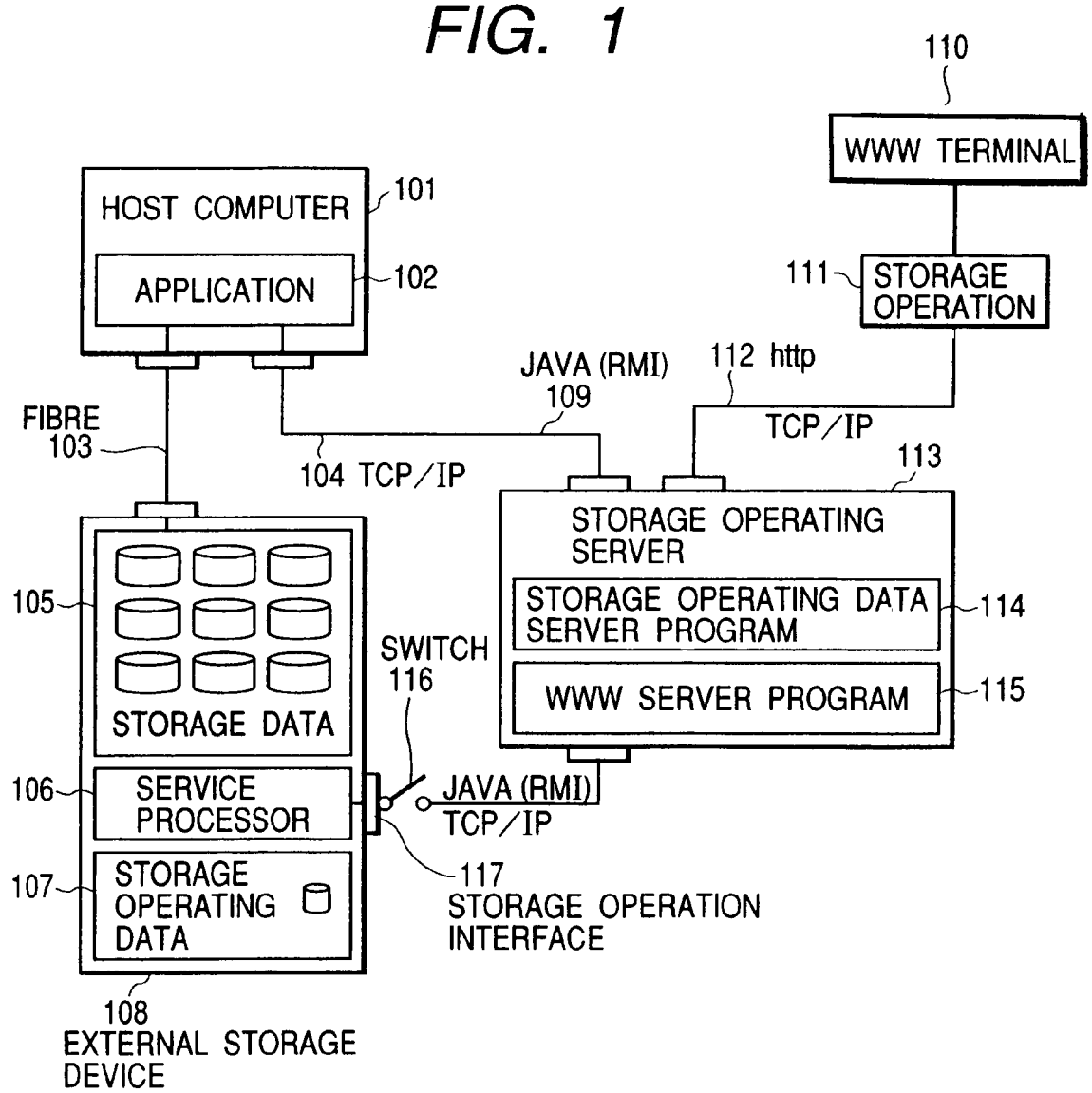
FIG. 1 is a view of the structure of a storage operation control system according to the present invention.
Figure 2:
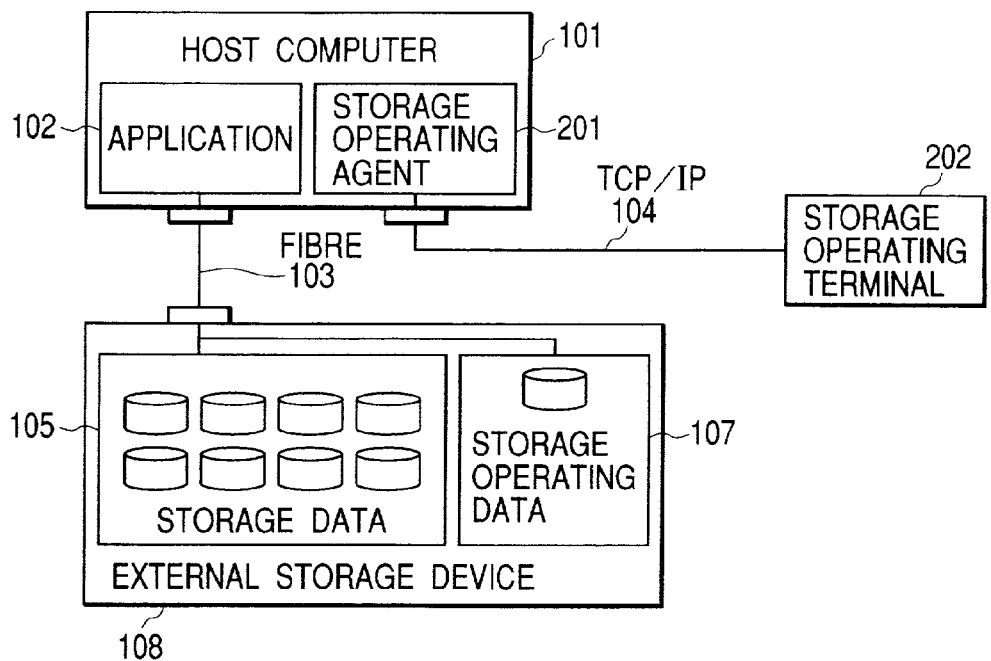
FIG. 2 is a view of the structure of the storage operation control system of the conventional "In band method"
Figure 3:
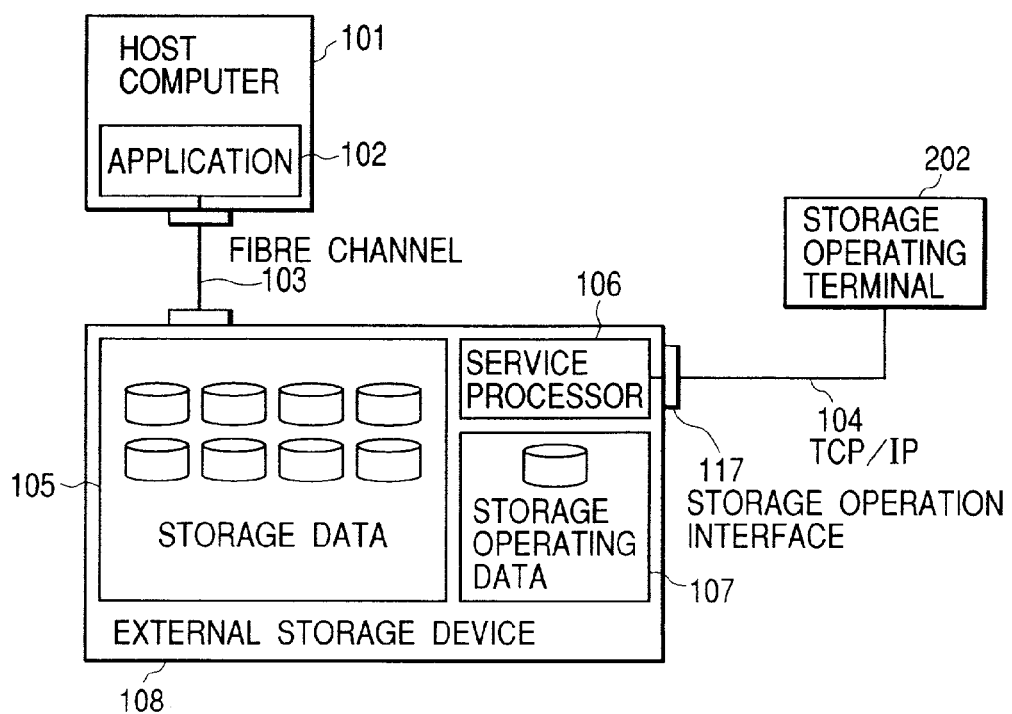
FIG. 3 is a view of the structure of the storage operation control system of the conventional "Out of band method"

First of all, explanation will be given on the structure of the system as a whole, by referring to FIG. 1. The FIG. 1 shows the computer system comprising an external storage device 108. On the host computer 101, a certain application 102 is initiated or started. In the external storage device 108 are stored storage data 105 which the application(s) 102 uses, and storage operating data 107, including obstruction information and/or construction information of the external storage device 108, etc. Further, in the external storage device 108, there is installed a service processor 106 for managing storage operating data 107. The external storage device 108 and the host computer 101 are connected to each other through a Fiber Channel 103. Through this interface, the host computer 101 is able to perform read-out/write-in of the storage data 105, however unable read-out/write-in on the storage operating data 107.

The storage operating server 113 is connected to an interface 117 for use in storage operation of the external storage device. Through this interface, network communication is performed between the service processor 106 and the storage operating server 113, thereby conducting transmission of the storage operating data 107. As an interface protocol, JAVA(RMI) 109 on TCP/IP 104 is applied to.

On the storage operating server 113, a WWW server program 115 is installed. With the WWW server program 115, it is possible to carry out operations, such as reference to the storage operating data, change thereof, etc.

Also, the communication between the storage operating server 113 and the host computer 101 is conducted by using a general-purpose interface, such as the JAVA(RMI) 109 on TCP/IP 104. Therefore, it is so constructed that the communication can be made easily between the application 102 of the host computer 101 and the storage operating data 107.

With the embodiment of the FIG. 1, it is proposed a method of adopting the "Out of band method", while taking in the advantages of the "In band method", as well. Namely, it is the method, in which the data 107 for use in storage operating can be read out and/or written in from the host computer 101, for the purpose of linking or cooperating of the storage operation and the application 102 of the host computer. The storage operating server 113 is provided, and the storage operating data 107 is obtained herein from the interface 117 for use in storage operation. A storage operating data server program 114 is resided in the storage operating server 113, so as to make possible the operation of the storage operating data 107 from the host computer 101. Further, installation of a WWW server program 115 into the storage operating server 113 brings the storage operating data 107 to be operated from a WWW terminal(s) 110 through the storage operation 111 using http protocol on TCP/IP 112, thereby enabling the storage operation in the same manner as in the conventional art.

Figure 4:
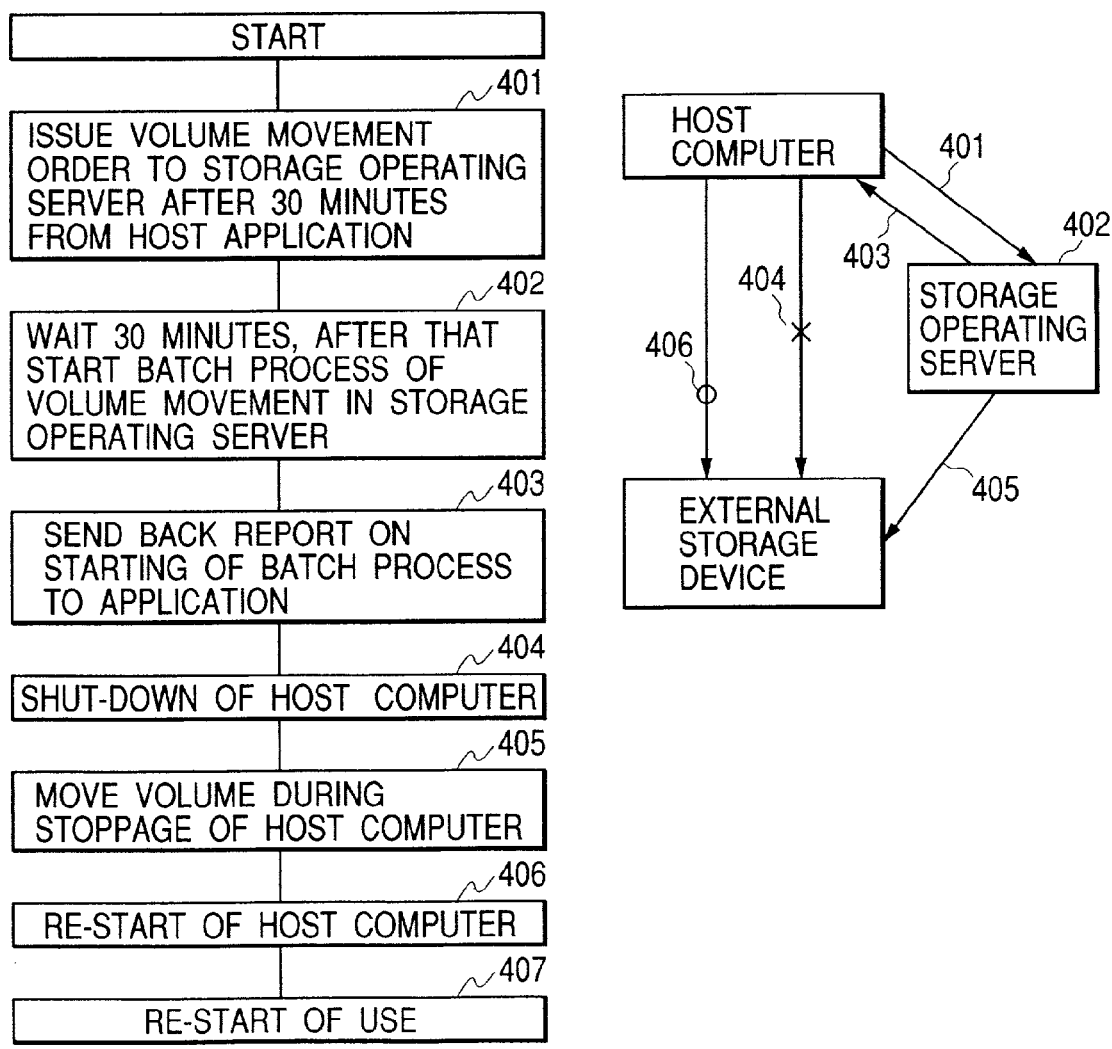
FIG. 4 shows an example, in which the storage operation is automatically performed during a down-operation of a host computer, linking up therewith.

An embodiment, in which the operating control is performed by using this system, while linking or cooperating with the host computer but independent thereupon, by referring to FIG. 4. First of all, an order or instruction for moving a volume of the storage is issued from the application 102 on the host computer 101, after thirty (30) minutes from the start of operation thereof (Step 401). The storage operating server 113, upon receipt of this, starts a batch processing for executing the volume movement, after waiting for thirty (30) minutes(Step 402). Immediately, after starting the batch processing, a report on starting of the batch processing is sent back to the application on the host computer 101 (Step 403).

After confirmation of this response, the host computer 101 is shut down (Step 404). The movement of the volume is carried out during stoppage of the host computer 101 (Step 405). The host computer 101 is started or initialized again (Step 406), and the use of the storage device is re-started (Step 407).

In this embodiment, because of circumstance of the application 102 on the host computer, change of the construction of the storage is conducted, linking or cooperating with the storage operating control, upon a demand of movement of volume and use thereof, thereby enabling such the operation that is unable with the conventional "Out of band method". And, the control thereof is able during the stoppage of the host computer 101, therefore the drawbacks in the "In band method" are also dissolved therein.

Further, with the provision of a physical and theoretical shut-off switch 116 in the interface for use in the storage operation, the storage operating control on the storage device can be refused from the WWW terminal 110, whenever it is necessary, by initiative of a user.

According to the present invention, it is possible to realize a storage operating control, with which the storage operating control can be obtained during the stoppage of the host computer, when performing the storage operating control, having the both advantages of no necessity of the agent software installed on the host computer according to the "Out of band method", and also of linking or cooperating with the application on the host computer according to the "In band method", thereby being able to refuse the storage operating control from a remote at any time when it is necessary by the initiative of the user thereof, with the provision of the shut-off switch for the storage operating control in the external storage device.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. A storage operating control system, comprising:
   an external storage device having storage data, storage operating data to manage a volume configuration and/or volume movement of said storage data, and a service processor for operating said storage operating data;
   a host computer coupled with said external storage device via a first connection; and
   a storage management server coupled with said host computer via a second connection and said service processor via a third connection,
   wherein said storage management server executes a storage operating data server program to manage said storage operating data via said third connection,
   wherein said host computer does not read/write said storage operating data directly from/to said external storage device, and instead executes an application program associated with said storage operating data server program so as to read/write said storage operating data indirectly from/to said external storage device through said storage management server and said third connection in order to manage the volume configuration and/or volume movement of said storage data, and wherein said host computer commands reads/writes of said storage data from/to said external storage device through said first connection, and wherein said storage management server is adapted to acknowledge said volume configuration and/or volume movement operation back to said host computer before said volume configuration and/or volume movement operation has completed, so as to enable turn-off of said host computer during at least a portion of said volume configuration and/or volume movement operation.

2. The storage operating control system according to claim 1, wherein said host computer operates in accordance with said storage operating data which the storage management server reads from said external storage device.

3. A storage operating control system according to claim 1, comprising a switch for selectively shutting off said third connection between said service processor and said storage management server.

4. A storage operating control system according to claim 3, wherein said switch is provided in an interface of said service processor.

5. A storage operating control system according to claim 1, wherein said storage management server comprising a WWW (World Wide Web) terminal connection and a WWW server program to allow access of the storage operating data using the WWW terminal connection.

6. A storage operating control system according to claim 1, wherein communication between said host computer and said storage management server on said second connection is at least partially conducted using JAVA Remote Method Invocation (RMI) on a transmission control protocol/Internet protocol (TOP/IP).

7. A storage operating control system according to claim 1, wherein communication between said service processor and said storage management server on said third connection is at least partially conducted using JAVA Remote Method Invocation (RMI) on a transmission control protocol/Internet protocol (TOP/IP).

8. A storage operating control system, comprising:
an external storage device having storage data configuration information to manage a volume configuration and/or volume movement of said storage data, and a service processor for operating said configuration information;
a host computer coupled with said external storage device via a first connection; and
a storage management server coupled with said host computer via a second connection and said service processor via a third connection,
wherein said storage management server executes a storage configuration server program to manage said configuration information via said third connection, wherein said host computer does not read/write said configuration information directly from/to said external storage device, and instead executes an application program associated with said storage configuration server program so as to read/write said configuration information indirectly from/to said external storage device through said storage management server and said third connection in order to manage the volume configuration and/or volume movement of said storage data, and wherein said host computer commands reads/writes of said storage data from/to said external storage device through said first connection, and wherein said storage management server is adapted to acknowledge said volume configuration and/or volume movement operation back to said host computer before said volume configuration and/or volume movement operation has completed, so as to enable turn-off of said host computer during at least a portion of said volume configuration and/or volume movement operation.

9. The storage operating control system according to claim 8, wherein said host computer operates in accordance with said configuration information which the storage management server reads from said external storage device.

10. A storage operating control system according to claim 8, comprising a switch for selectively shutting off said third connection between said service processor and said storage management server.

11. A storage operating control system according to claim 10, wherein said switch is provided in an interface of said service processor.

12. A storage operating control system according to claim 8, wherein said storage management server comprising a WWW (World Wide Web) terminal connection and a WWW server program to allow access of the configuration information using the WWW terminal connection.

13. A storage operating control system according to claim 8, wherein communication between said host computer and said storage management server on said second connection is at least partially conducted using JAVA Remote Method Invocation (RMI) on a transmission control protocol/Internet protocol (TCP/IP).

14. A storage operating control system according to claim 8, wherein communication between said service processor and said storage management server on said third connection is at least partially conducted using JAVA Remote Method Invocation (RMI) on a transmission control protocol/Internet protocol (TCP/IP).

* * * * *